US012041706B2

(12) United States Patent
Li

(10) Patent No.: US 12,041,706 B2
(45) Date of Patent: Jul. 16, 2024

(54) LED LAMP AND LOCAL IR DIMMING ASSEMBLY THEREOF

(71) Applicant: Shenzhen Wanjia Lighting Co., Ltd., Shenzhen (CN)

(72) Inventor: Fei Li, Shenzhen (CN)

(73) Assignee: Shenzhen Wanjia Lighting Co., Ltd., Shenzhen (CN)

( * ) Notice: Subject to any disclaimer, the term of this patent is extended or adjusted under 35 U.S.C. 154(b) by 190 days.

(21) Appl. No.: 17/862,995

(22) Filed: Jul. 12, 2022

(65) Prior Publication Data

US 2023/0209691 A1 Jun. 29, 2023

(30) Foreign Application Priority Data

Dec. 27, 2021 (CN) ........................ 202111618413.2

(51) Int. Cl.
*H05B 47/195* (2020.01)

(52) U.S. Cl.
CPC ................................ *H05B 47/195* (2020.01)

(58) Field of Classification Search
CPC ...... H05B 47/195; H05B 45/10; H05B 47/19; F21S 2/00; F21V 23/0435; F21Y 2115/10
See application file for complete search history.

(56) References Cited

U.S. PATENT DOCUMENTS

2009/0058315 A1* 3/2009 Baeumle ................ H05B 47/19 315/291
2011/0001455 A1* 1/2011 Dowdy .................. F21V 23/04 320/107
2015/0260385 A1* 9/2015 Brynjolfsson ........ F21V 23/045 362/183

* cited by examiner

*Primary Examiner* — Daniel D Chang
(74) *Attorney, Agent, or Firm* — AEON Law, PLLC; Adam L. K. Philipp; Charlotte E Holoubek

(57) ABSTRACT

The present application discloses an LED lamp and a local IR dimming assembly integrated with the LED lamp. The LED lamp comprises a hollow lamp housing, an LED light source module and a driver module. The local IR dimming assembly comprises an IR emitter for emitting infrared signals, with a physical control mechanism for controlling the transmission of infrared signals; an IR receiver configured to be electrically connected with the driver module, and to receive and transmit an infrared signal from the IR emitter to the driver module; wherein the IR emitter and the IR receiver are both arranged in the LED lamp in the form of infrared communication; through the local manipulation of the physical control mechanism of the IR emitter, at least the optical output power of the LED lamp is locally adjusted and controlled.

20 Claims, 15 Drawing Sheets

Integral-type lamp (1)

Integral-type lamp (2) with replacable internal components

Split-type lamp (1)

Split-type lamp (2)

Split-type lamp (3)

LED LAMP AND LOCAL IR DIMMING ASSEMBLY THEREOF

This application claims priority to Chinese application No. 202111618413.2, filed on Dec. 27, 2021 and entitled "LED Lamp and Local IR dimming assembly integrated therewith", the entire content of which is incorporated herein by reference.

TECHNICAL FIELD

The present application relates to the field of LED lamps, and more particularly to a local infrared (IR) dimming assembly for LED lamps.

RELATED ART

In the LED lamp technology, in order to achieve better lighting application, field installation personnel often carry many types of lamps, such as lamps of different brightness (or optical output power) and different colors, so as to achieve an adaptive installation on site. Even so, there may be times when the brightness or the beam size does not meet the requirements.

In view of the above market pain points, there is a need for a lighting device or method in the art, which allows the field installation personnel to easily and conveniently change the brightness, illumination, color, etc. of the lighting device on site without requiring special tools and without damaging the waterproof performance of the lamp, so as to immediately present a better lighting effect, especially for an outdoor vital lighting.

In order to realize an easy setting of lamps on site and other purposes, the present application adopts a new type of local infrared dimming design without using an infrared remote controller. Among the infrared remote controllers used in the current LED lamps, only an IR receiving head is set on the LED lamps, and the IR emitter is provided to the user in the form of a remote controller to remote control by hand Generally, infrared remote controllers of LED lamps have the same remote control frequency or code, which is prone to induce a "crosstalk" of the remote control signals, which in turn may cause interference or misoperation on other neighboring LED lamps or devices, and therefore poses a challenge to the independent dimming and display of the installed LED lamps and the setting and recording of the status of individual LEDs, and causes great inconvenience to the remote control debugging personnel at the installation site, and errors may easily be induced.

In addition to the "crosstalk" of the remote control signals, the infrared remote controllers of LED lamps are easy to be lost, which makes it difficult to record and display the setting status of LED lamps, and increases the difficulty for field installation personnel to adjust and set LED lamps.

Therefore, there is a need for an innovative LED lamp dimming technology in the art to eliminate the above technical defects, and other defects.

SUMMARY

According to an aspect of the present application, a lamp with a local infrared (IR) dimming control is proposed, such as for adjusting the brightness (or the optical output) of the lamp, allowing the field installation personnel to complete the control operation on site without the help of special tools, and reliably ensuring the waterproof performance of the device. It can avoid the defects that only one-to-many mode is possible and it is difficult to record the setting status when using the infrared remote controller, and realize a local one-to-one adjusting, and synchronously mark the setting status.

According to another aspect of the present application, there is provided a local-control lamp with an integrated infrared dimming unit, which can adjust the brightness and/or the color, which can be used in different places such as indoor or outdoor, especially suitable for the projection lamp/flood lamp of outdoor landscape lighting.

In view of the above and other concept, the inventor creatively proposes that the IR emitter and the IR receiver are both arranged in the LED lamp in infrared communication, and the local IR dimming control is realized by locally operating the physical control mechanism of the IR emitter, for example, the local control of the optical power of at least the LED lamp. In the situation that no remote controller is additionally configured, the cost of additionally configuring the infrared remote controller and the trouble of keeping it can be saved.

The present application can realize a local infrared dimming, and can avoid or reduce the situation that the infrared dimming signal is easy to "crosstalk" and cause interference or misoperation on adjacent device.

In a traditional infrared remote control device, it is difficult to locally mark the corresponding setting status on the LED lamp, which causes great inconvenience to the user and the field installation and debugging personnel, and it is difficult to obtain or master the real setting status of the LED lamp at the first time. The concept according to an embodiment of the present application can solve the problems that have been existing in the industry, and can provide the indication of setting status with a high reliability and a high efficiency.

According to the concept of an aspect of the present application, the aim is to provide an LED lamp and a local IR dimming assembly integrated with the LED lamp; the LED lamp comprises a hollow lamp housing, an LED light source module and a driver module; the local IR dimming assembly comprises an IR emitter for emitting infrared signals, with a physical control mechanism for controlling the transmission of infrared signals; an IR receiver configured to be electrically connected with the driver module, and to receive and transmit an infrared signal from the IR emitter to the driver module; wherein the IR emitter and the IR receiver are both arranged in the LED lamp in way of infrared communication; wherein through the local manipulation of the physical control mechanism of the IR emitter, at least the optical output power of the LED lamp is locally adjusted and controlled.

Another aspect of the application also provides an LED lamp, which comprises a hollow lamp housing, an LED light source module and a driver module, wherein the LED lamp further comprises the local IR dimming assembly mentioned above, the LED light source module and the driver module being in electric connection with the IR receiver of the local IR dimming assembly.

DETAILED DESCRIPTION

The present application will be described in more details below with reference to embodiments of the present application.

The term "dimming" shall be broadly interpreted in the present application to include regulating the output power (or brightness), color temperature, color, or on/off of the light of the lamp, or any combination of the above listed items.

Embodiment 1

As shown in FIGS. 1-4, an LED spotlight can be locally infrared dimmed according to the first embodiment is disclosed. The LED spotlight has a substantially cylindrical lamp housing 40 in which an LED light source module 30 and a driver module 20 are installed.

Figure 2:
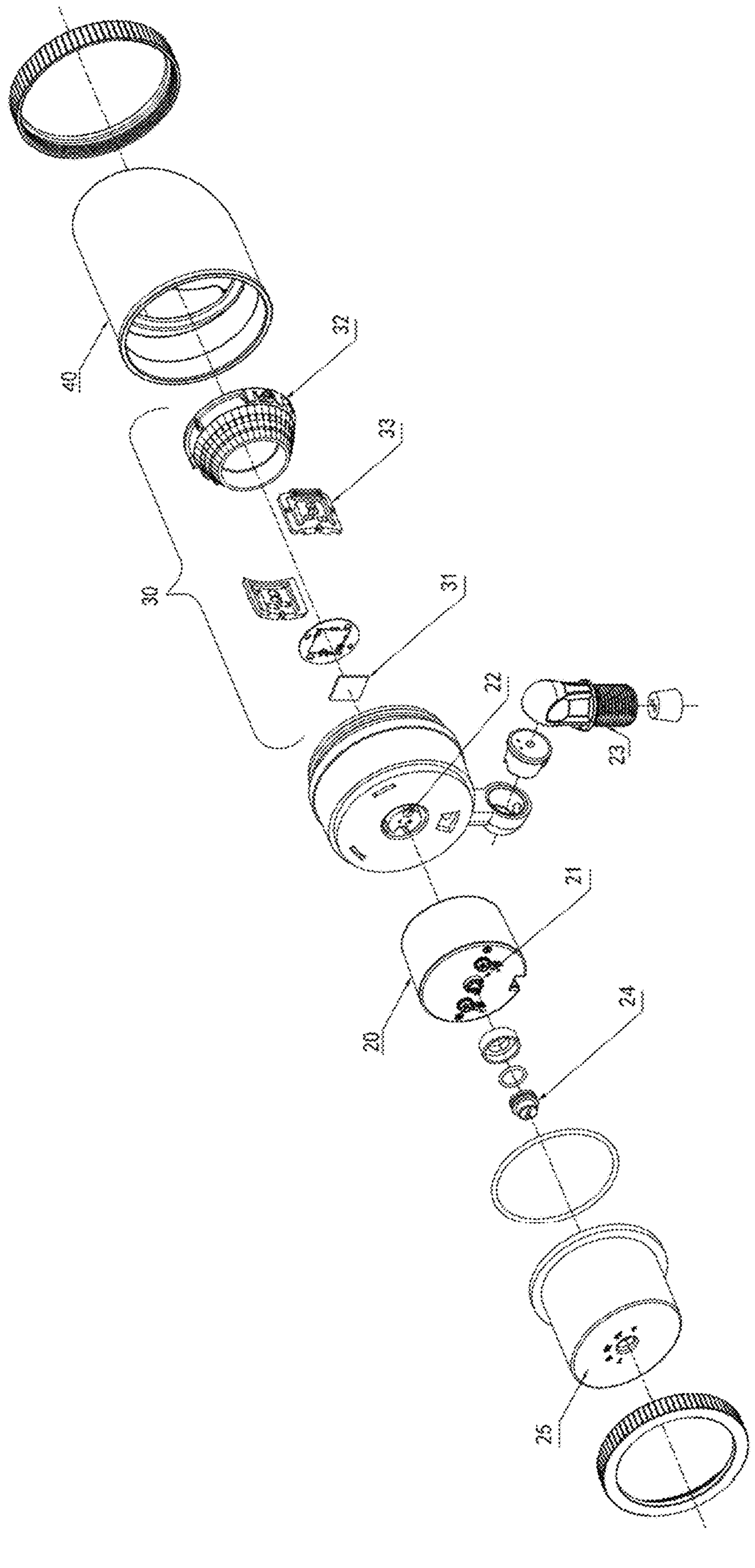
FIG. 2 is an exploded schematic view of the structure of the LED spotlight shown in FIG. 1.
Figure 3:
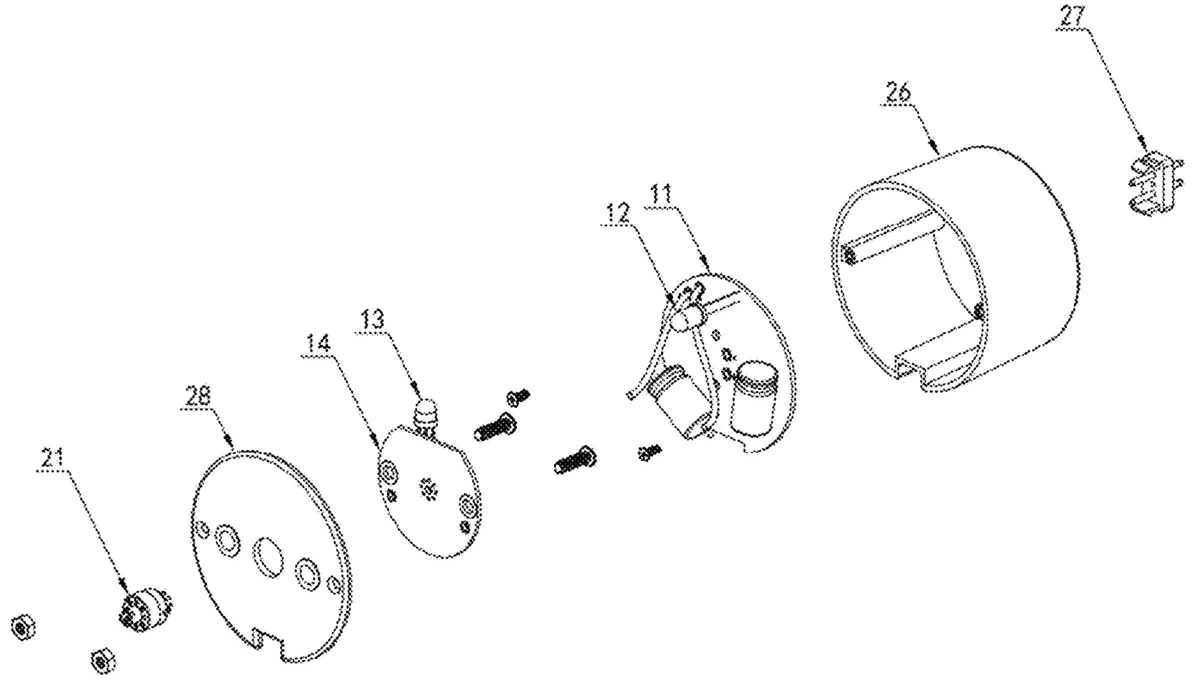
FIG. 3 is an exploded schematic view of the driver module and the local IR dimming assembly of the LED spotlight shown in FIG. 1.

The LED light source module 30 may include an LED lamp panel with an LED light source 31, a lens 32, a zoom bracket 33, and other accessories on the LED lamp panel. The LED lamp 31, the lens 32, the zoom bracket 33 and other accessories in the LED light source module 30 are integrally installed together, as shown in FIG. 2. For example, the driver module 20 can be electrically connected with the output plug-in terminal 22 of the LED light source module through the pluggable pin 27 of the output terminal (other electrical connections, such as wires, welding wires, etc. are also like this). During actual maintenance, the light source module can be directly replaced to avoid on-site detection of faulty parts, to speed up maintenance and to reduce maintenance difficulty, to avoid replacement of lamp body and to reduce the maintenance cost. In addition, when it is necessary to change the lighting effects, it is only necessary to replace the light source modules with different lighting effects.

The LED spotlight also includes a local IR dimming assembly integrated with the LED lamp. The driver module 20 is, for example, a substantially cylindrical structure that can be accommodated in the lamp housing 40, and the IR receiver 12 is mounted on the IR receiver circuit/drive circuit board 11 disposed therein. The side opposite to the IR receiver circuit/drive circuit board 11 is provided with an IR emitter circuit board 14 on which an IR emitter 13 is arranged. The IR emitter 13 and the IR receiver 12 are arranged to be in infrared communication with each other. They are for example set opposite to each other or even close to each other, as shown in the figure. In this way, on the one hand, the signal strength of infrared communication can be ensured, and on the other hand, interference to other neighboring remote control device can be avoided.

The LED spotlight can also be provided with a mounting support 23, one end of which can be connected to the light source module, for example, and the other end can be fixed, for example, screwed in the mounting position. The mounting support 23 may be hollow and may be wired from it.

One end of the substantially cylindrical lamp housing 40 is provided with a light outlet for projecting light; and the other end, that is, the bottom end, can be provided with a bottom shell 25.

Figure 1:
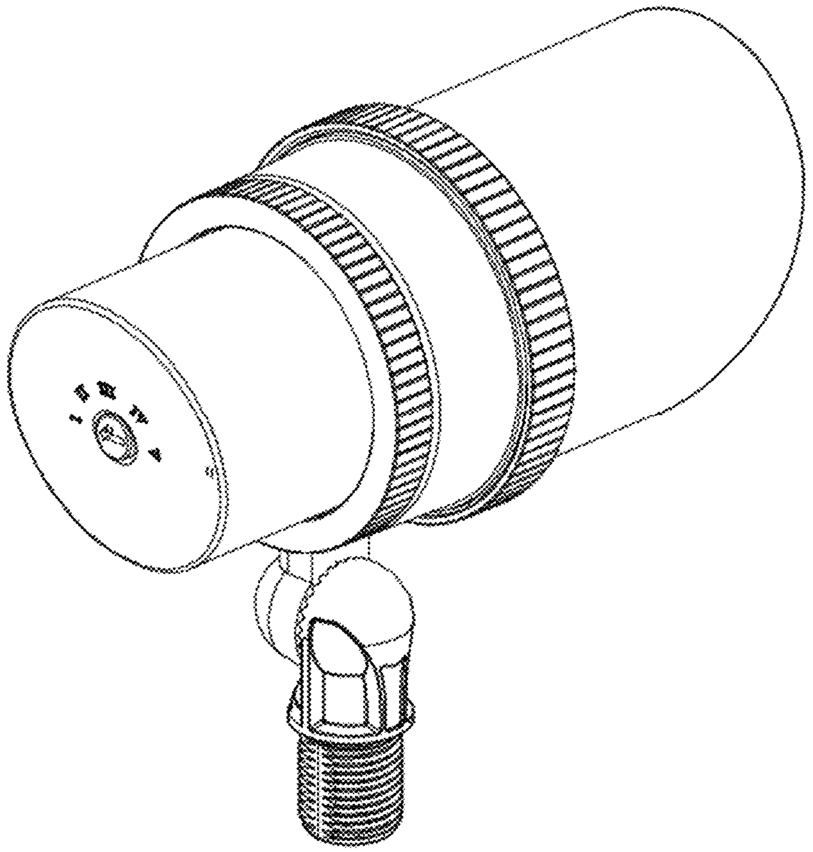
FIG. 1 shows a schematic view of the configuration of an LED spotlight according to the first embodiment of the present application.
Figure 4A:
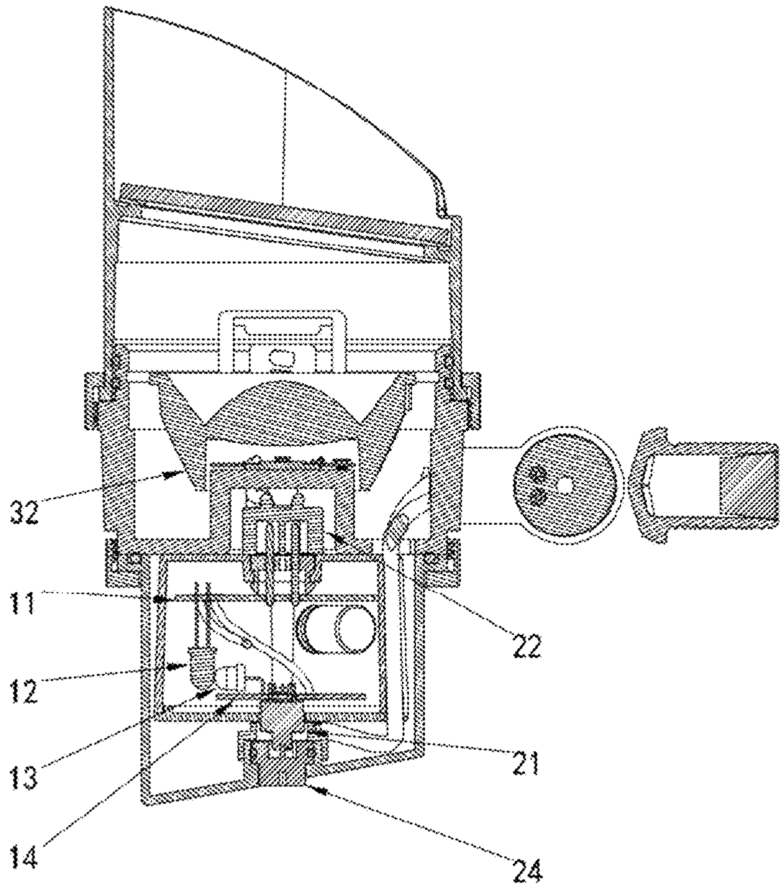
FIG. 4A is a schematic longitudinal sectional view of a part of the LED spotlight shown in FIG. 1, showing the structure of the LED spotlight and the exploded schematic view of the driver module and the local IR dimming assembly.
Figure 4B:
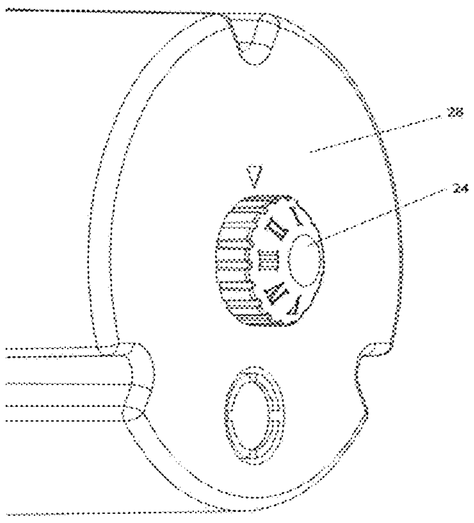
FIG. 4B is an enlarged schematic view showing a manipulator arranged outside the bottom shell and its level identifications according to an example.

FIG. 4A is a schematic longitudinal sectional view of a part of the LED spotlight shown in FIG. 1, showing the structure of the LED spotlight and the exploded schematic view of the power module and the dimming signal control knob 21 and the manipulator 24 of the local IR dimming assembly. FIG. 4B is an enlarged schematic view showing a manipulator 24 arranged outside the bottom shell and its level identifications according to an example. The local IR dimming assembly includes an IR emitter installed on the LED spotlight, which may include, for example, an IR emitter circuit board 14 and an IR emitter 13 arranged thereon. The local IR dimming assembly also includes, for example, a physical control mechanism that can be installed on the end cover 28 of the driver module 20, including, for example, a dimming signal control knob 21 for sending dimming commands/signals. The physical control mechanism can be in the form of a dimming signal control knob 21. Of course, it can also be in the form of a dimming signal control button or a dimming signal shifting control key, or any other form and structure suitable for local dimming of LED spotlights.

The dimming signal control knob 21 can be manually operated by the operator through the manipulator 24 which is operably connected with it and at least partially comes out from the bottom shell 25. In this way, without disassembling the light source module, the operator can manually adjust and control the physical mechanism locally/on-site to adjust the LED light source module through the infrared communication signal, so as to realize the adjustment and control of the brightness and/or light color of the LED lamp.

According to an example, the physical dimming mechanism can realize a stepwise dimming. For example, the dimming signal control knob 21 can realize a stepwise, or alternatively called as level-by-level, dimming, for example, it can be adjusted in five levels. For example, as shown in FIG. 4*b*, five level indications (I, II, III, IV, V) are set together with the dimming signal control knob 21 and the manipulator 24 of the physical control mechanism, so that the user can clearly identify the current level status of the physical control mechanism and display which level the dimming signal control knob 21 corresponding to the manipulator 24 of the physical control mechanism is currently at.

The local IR dimming assembly also includes an IR receiver, which can include an IR receiver circuit/drive circuit board 11 and an IR receiver 12 installed on it. The IR receiver is electrically connected with the driver module 20, and receives and transmits the dimming signal from the physical control mechanism 21 to the driver module 20, and communicates with the LED light source module through the driver module for dimming and other control purposes, such as color matching, brightness adjustment, turning on/off, and so on.

In this embodiment, both the IR emitter and the IR receiver are positioned on the LED lamp in a way that they are configured and positioned to be in infrared communication with each other. For example, they are arranged at the opposite ends/both sides of the driver module as shown in the figures. By locally operating the physical control mechanism of the IR emitter, the optical output power of at least LED lamps can be locally controlled, realizing the dimming of LED lamps and the adjustment of the luminous flux.

The driver module can be fixed on the bottom shell. When the bottom shell is removed, the driver module can be accessed/removed, which increases the convenience of access, installation, disassembly and maintenance of the driver module and its infrared dimming devices.

Figure 10:
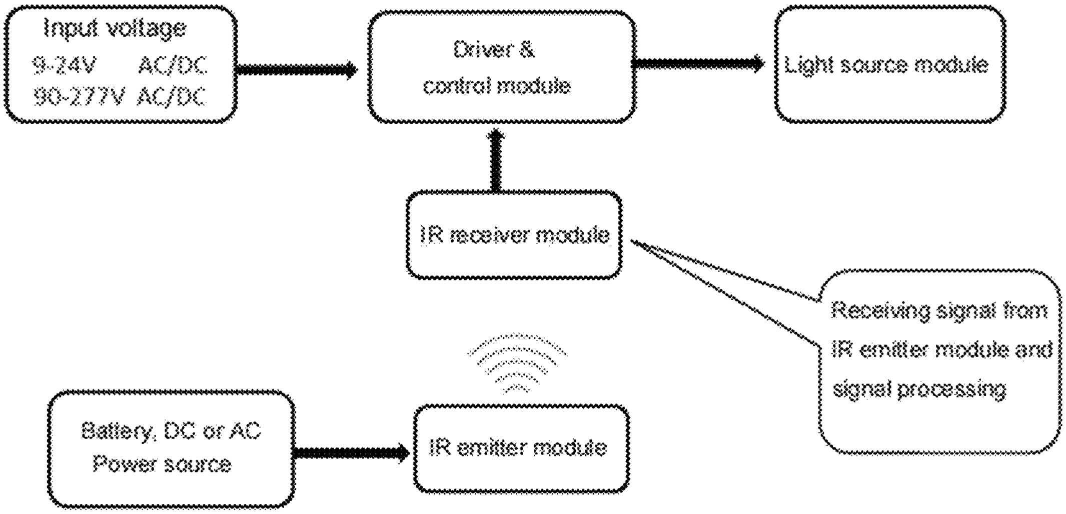
FIG. 10 shows a simplified schematic view of the infrared dimming principle of the LED spotlight according to an example of the present application.
Figure 11:
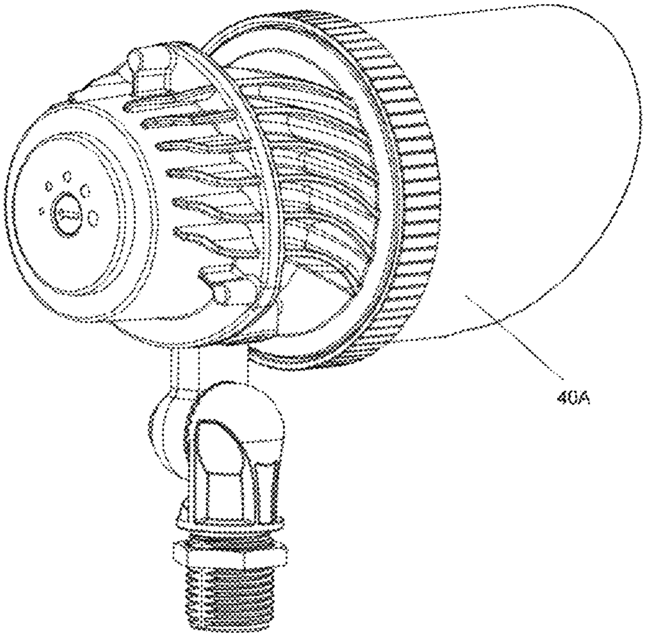
FIG. 11 shows the overall schematic view of a split LED spotlight with a local IR dimming assembly according to another embodiment of the present application.
Figure 12:
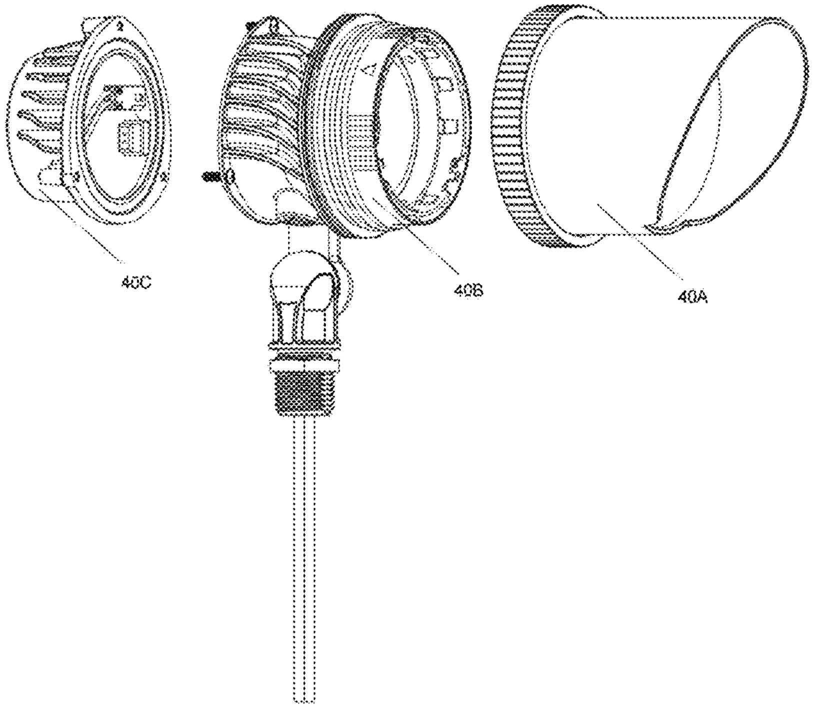
FIG. 12 shows the schematic view of the three main modules of the split LED spotlight shown in FIG. 11.

The IR receiver can also be set on the driver module, and the IR emitter can be set at a position on the inner wall of the lamp housing 40, as long as the position makes the communication path between the IR emitter and the IR receiver unobstructed, and can normally send and receive infrared commands/signals from the IR emitter. The IR emitter module transmits the command to the IR receiver module, which is received and processed, and can be used to control the dimming of the LED spotlight, as shown in FIG. 10, which shows a simplified schematic view of an example of the infrared dimming principle of the LED spotlight.

The IR emitter can also be arranged on the inner side of the bottom shell, and the IR receiver can be arranged on the driver module, opposite to the IR emitter. In this regard, the physical control mechanism of the IR emitter can be arranged on the inner side of the bottom shell, or directly or indirectly on the outer side of the bottom shell. Setting the physical control mechanism 21 of the IR emitter directly or through the manipulator 24 on the outside of the bottom shell 25 is a preferred example, because it is convenient for the operator to conduct infrared control and/or dimming from the outside of the LED lamp. At the same time, the manipulator 24 can be easily connected with the physical control mechanism through, for example, a small through hole through the bottom shell.

Embodiment 2

As shown in FIGS. 5-8, an LED spotlight can be locally infrared dimmed according to the second embodiment disclosed. The LED spotlight has a substantially cylindrical lamp housing 400, an integral replaceable module 100 is installed in the lamp housing 400, and an integrated LED light source+driver module and an infrared dimming assembly are installed in the cylindrical housing 126 of the replaceable module 100.

Figure 5:
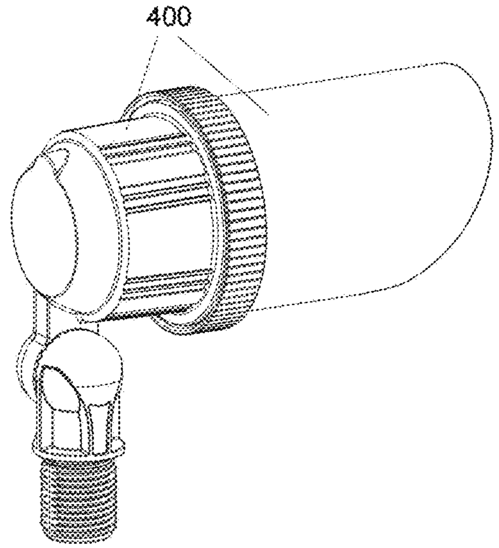
FIG. 5 is a schematic view of the structure of an LED spotlight according to the second embodiment of the present application.
Figure 6:
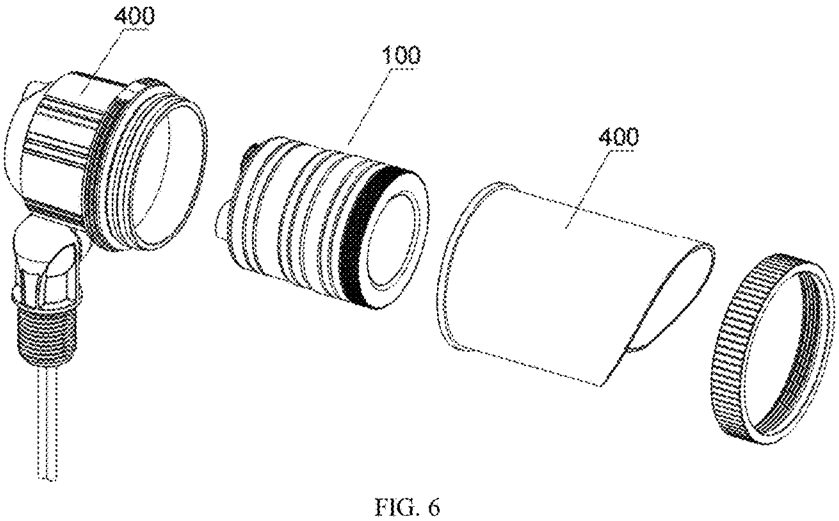
FIG. 6 is an exploded schematic view of the LED spotlight shown in FIG. 5, showing the main structure modules of the LED spotlight embodiment.

The LED light source+driver module may include an LED lamp panel and its LED light source, a replaceable lens 127 and other accessories on it, as well as an IR receiving+drive circuit board 111 on which an IR receiver 112 is installed, as shown in FIGS. 5-6.

Figure 7:
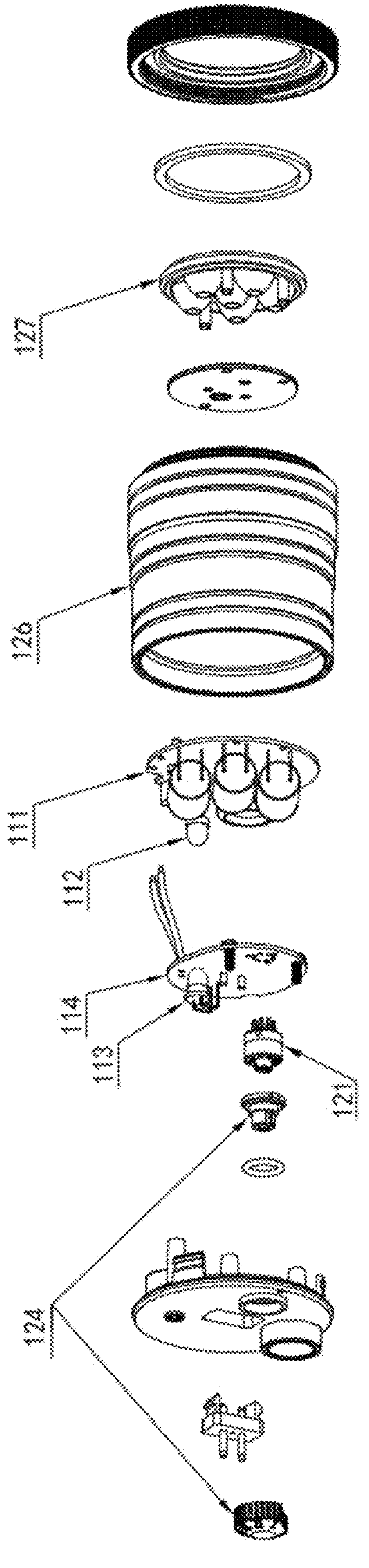
FIG. 7 is a more detailed exploded schematic view of the structure of the LED spotlight shown in FIG. 5.
Figure 8:
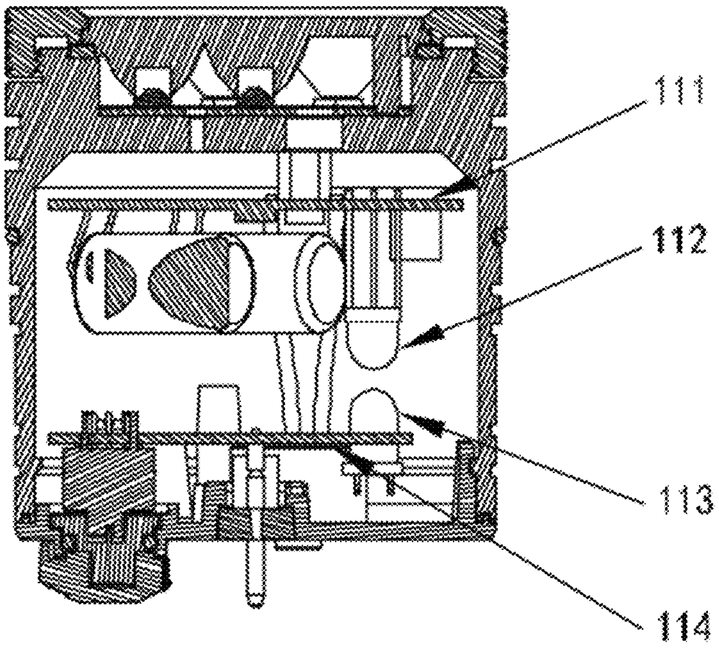
FIG. 8 is a schematic longitudinal sectional view of the replaceable module of the LED spotlight shown in FIG. 5, showing the integrated LED light source module, the driver module and the local IR dimming assembly.

Opposite to the IR receiving+drive circuit board 111, an IR emitter circuit board 114 on which an IR emitter 113 is mounted is provided, as shown in FIGS. 6-8. The IR emitter 113 is arranged opposite to the IR receiver 112 to transmit and receive infrared dimming signals.

For example, the IR emitter circuit board 114 in the LED light source+driver module 100 is provided with a physical control mechanism, including, for example, a dimming signal control knob 121, for emitting infrared signals. The physical control mechanism can be in the form of a dimming signal control knob 121. Of course, it can also be in the form of a dimming signal control button or a dimming signal shifting control key, or any other form and structure suitable for dimming.

The dimming signal control knob 121 can be manually operated by the operator through the manipulator 124 which is operably connected with it and at least partially comes out from the lamp housing 400, for example comes out from the bottom shell. In this way, without disassembling the light source module, through the manipulator 124 for example, the operator can manually adjust and control the physical mechanism locally/on-site to adjust the LED light source module through the infrared communication signal, so as to realize the adjustment and control of the brightness and/or light color of the LED lamp.

According to an example, the physical dimming mechanism can be used to realize a stepwise dimming. For example, the dimming signal control knob 121 can be used to realize a level-by-level dimming, for example, it can be adjusted in two to five levels. Preferably, a five level status indication is set in conjunction with the dimming signal control knob 121 so that the user can clearly identify the current position status of the physical dimming mechanism, for example, to display which level of the five levels the dimming signal control knob 21 is currently at.

Embodiment 3

The difference between the local IR dimming assembly of this embodiment and the first embodiment or the second embodiment is that a wireless communication module for receiving external control signals can be additionally (i.e., redundantly) set on the LED lamp, such as on the driver module. For example, mobile phones and special transmission/communication control device are connected, so that the external control device can also wirelessly control the light source module of LED lamps for wireless remote control of brightness adjustment, color temperature adjustment, switch control, etc. The wireless communication module can be equipped with electrically connected keys, microcontrollers and wireless communication transmitters. The keys include on key, off key and brightness/color temperature mode selection key.

Embodiment 4

As shown in FIGS. 11-14, a locally infrared dimmable LED spotlight of the fourth embodiment and the arrangement of its IR dimming assembly are disclosed. The LED spotlight has a substantially cylindrical lamp housings 40A, 40B and 40C, wherein an LED light source module 30A and a driver module 20A are installed in the lamp housings 40B and 40C respectively. Other components, such as auxiliary optical elements, may be selectively mounted on the lamp housing 40A, and light is emitted from the front end of the lamp housing 40A.

Figure 13:
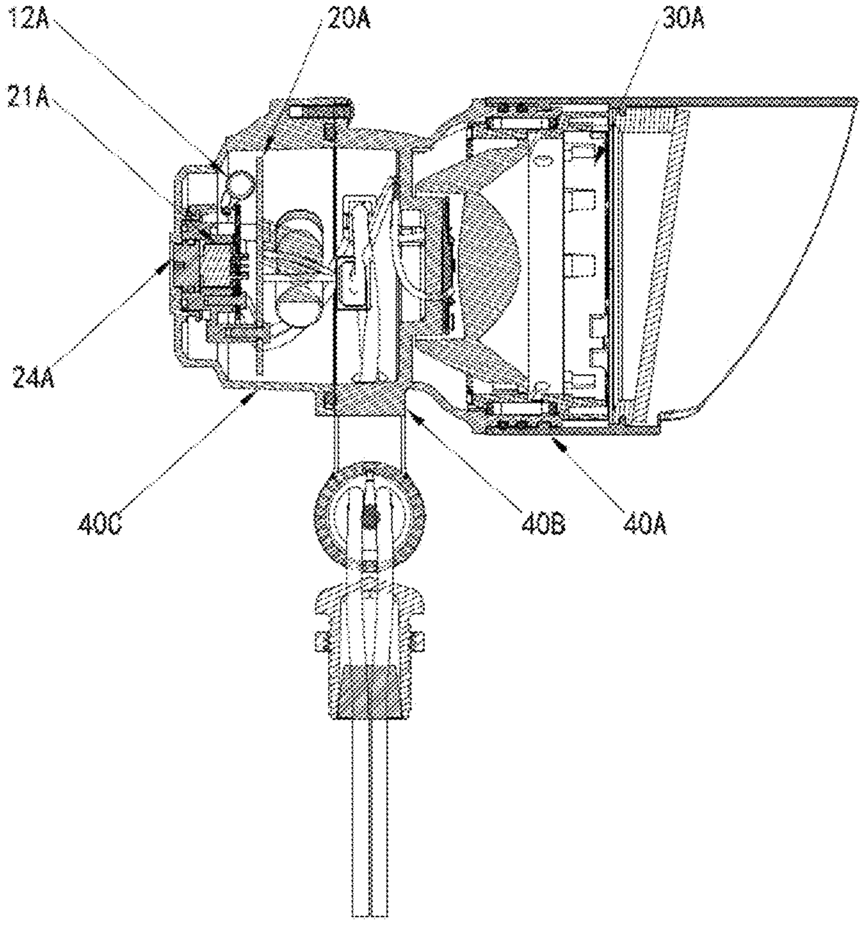
FIG. 13 shows the longitudinal section diagram of the internal structure of the split LED spotlight shown in FIG. 11.
Figure 14:
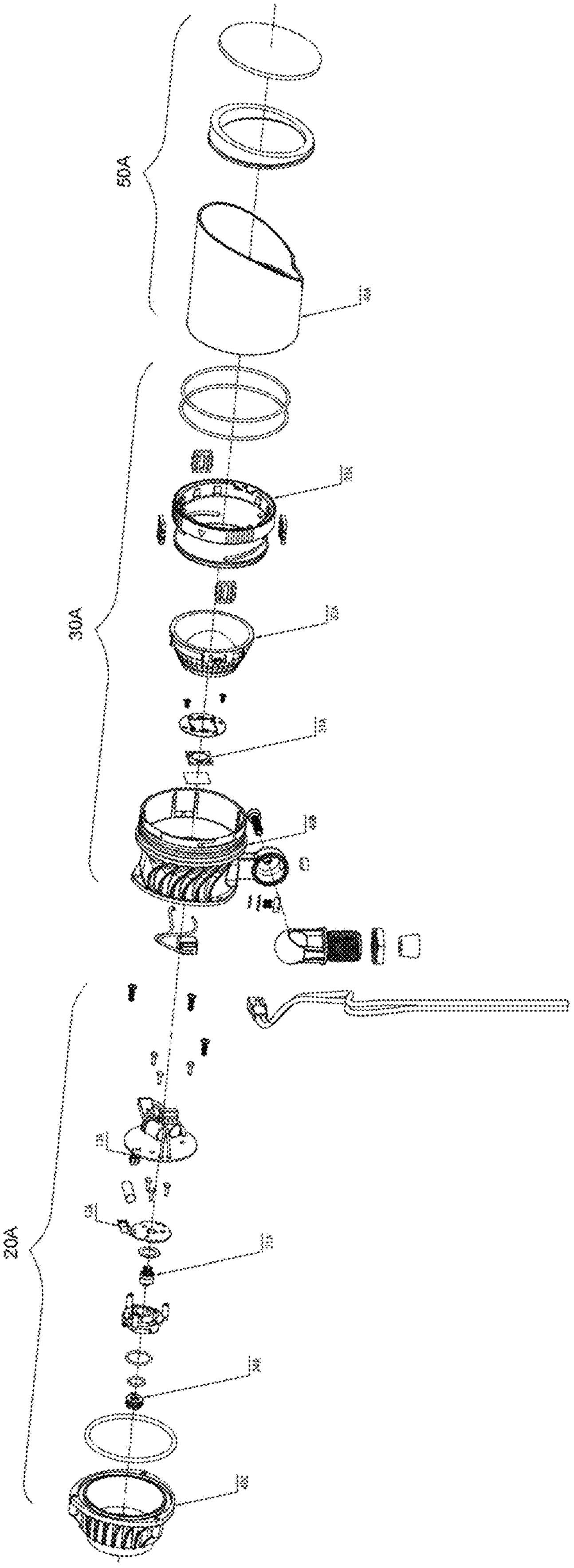
FIG. 14 shows the exploded schematic view of the split LED spotlight shown in FIG. 11.

The LED light source module 30A may include an LED lamp panel, an LED light source 31*a*, a lens 32*a*, a zoom bracket 33A and other accessories. LED lamp 31A, lens 32A, zoom bracket 33A and other accessories are integrally installed together, as shown in FIGS. 13-14. The driver module 20A is electrically connected with the LED light source module 30A to supply power to it during operation. The LED light source module 30A and the driver module 20A installed in the lamp housing 40B and 40C are independent modules and can be easily removed.

The LED spotlight also includes a local IR dimming assembly integrated with it. The driver module 20A is, for example, of a substantially cylindrical structure that can be accommodated in the lamp housing 40C, and the IR receiver 12A is mounted on the IR receiver circuit board in the lamp housing 40C. For example, the IR receiver 12A may be welded to the IR receiver circuit board through the IR emitter circuit board.

Figure 16:
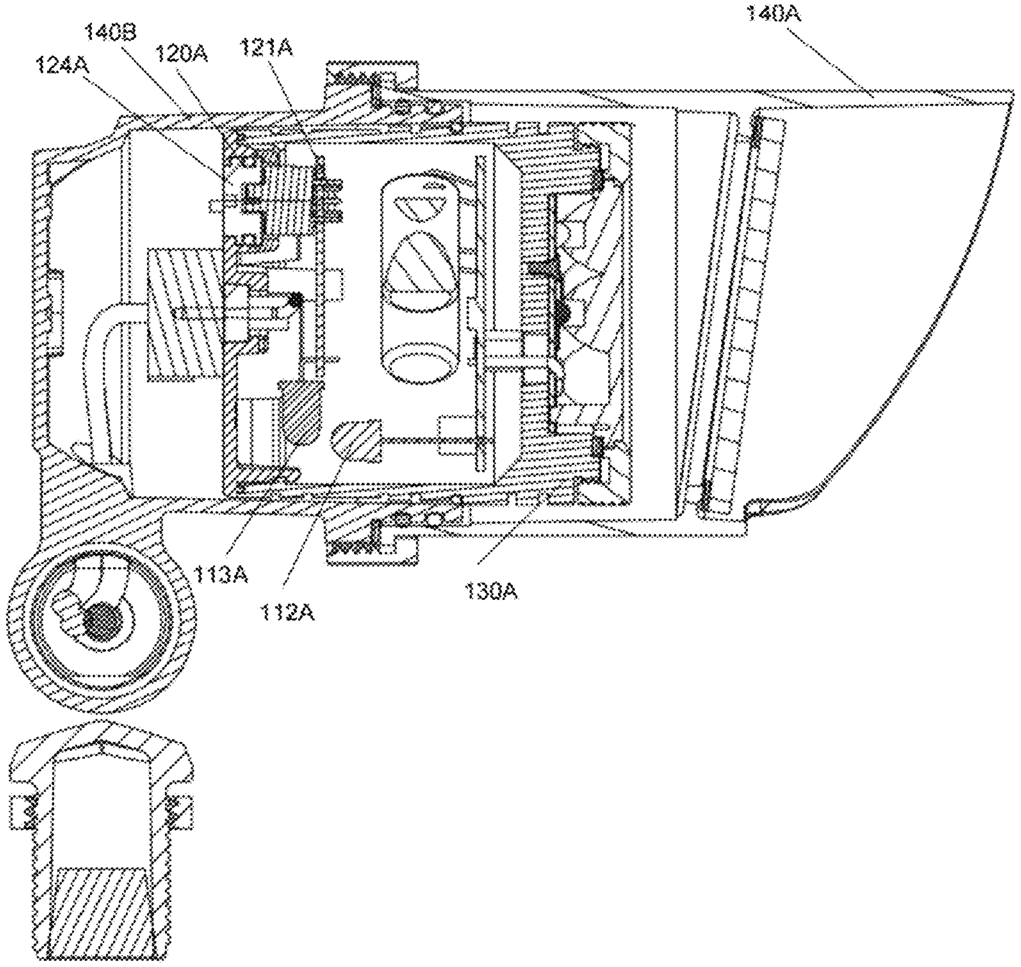
FIG. 16 shows a longitudinal section diagram of the internal structure of the integral LED spotlight shown in FIG. 15.

An IR emitter circuit board is arranged in the lamp housing 40C opposite to the IR receiver circuit board, on which an IR emitter 13*a* is arranged. The IR emitter 13A and the IR receiver 12A are arranged at a position facilitating the infrared communication with each other. For example, an IR emitter circuit board is arranged opposite to the IR receiver circuit board, on which the IR emitter 13A is arranged. The IR emitter 13 and the IR receiver 12A are arranged opposite to each other in the lamp housing 40C, or may be arranged adjacent to each other, as shown in FIG. 16. In this way, on one hand, the signal strength of infrared communication can be ensured; on the other hand, especially when the lamp housing 40C is a hollow metal housing, interference with other remote control device nearby can be avoided.

The local IR dimming assembly includes an IR emitter installed on the LED spotlight, which can include, for example, an IR emitter 13A and its related circuits. The local IR dimming assembly also includes a physical control mechanism, such as the dimming signal control knob 21A, which is used to send dimming commands/signals. The physical control mechanism can be in the form of a dimming signal control knob 21A. Of course, it can also be in the form of a dimming signal control button or a dimming signal shifting control key, or any other form and structure suitable for local dimming of LED spotlights.

According to an example, the IR emitter 13A and the IR receiver 12A can be sealed and arranged in the same sleeve, such as a double-layer sleeve, and can be filled with glue as a whole. Such benefits can not only contribute to good infrared communication between the IR emitter 13A and the IR receiver 12, but also ensure a waterproof and moisture-proof sealing, so as to ensure the reliability of the operation of the IR emitter 13A and the IR receiver 12.

With the dimming signal control knob 21A, the operator can manually operate the dimming signal control knob 21A for IR dimming through the manipulator 24A that is operatively associated with the dimming signal control knob 21A and can be reached from the outside of the LED spotlight, so as to adjust and control the brightness or/and light color of the LED lamp.

According to an example, the physical dimming mechanism can realize a stepwise dimming. For example, the dimming signal control knob 21A can realize a stepwise, or alternatively called as level-by-level, dimming. For example, it can be adjusted in five levels. For example, as shown in FIGS. 13-14, five level indications (I, II, III, IV, V) are set together with the dimming signal control knob 21A and the manipulator 24A of the physical control mechanism, so that the user can clearly identify the current level position status of the physical control mechanism and display the current level position of the dimming signal control knob 21A corresponding to the manipulator 24A.

The local IR dimming assembly also includes an IR receiver, which can include an IR receiver 12A and its associated circuit. The IR receiver is electrically connected with the driver module 20A, and receives and transmits the IR dimming signal from the physical control mechanism 21A for dimming and other possible control purposes, such as color matching, on/off, and so on.

Embodiment 5

As shown in FIGS. 15-18, an LED spotlight can be locally infrared dimmed according to the fifth embodiment disclosed. The front end and the rear end of the LED spotlight are respectively provided with a roughly cylindrical lamp housing 140A and 140B which can be connected together by screwing threads. The lamp housings 140A and 140B are installed with an integral replaceable power source–light source integrated module 120A-130A. The power source module 120A, the light source module 130A and the IR dimming assembly are integrated in the power source–light source integrated module 120A-130A.

The integrated LED light source–power source module can include LED lamp panel, LED light source, optical lens, focusing device and other accessories, as well as the IR receiver circuit board installed with an IR receiver 112A, as shown in FIG. 16.

The IR receiver circuit board and the IR receiver 112A are relatively provided with an emitting circuit board installed with the IR emitter 113A, as shown in FIG. 16. For example, the IR emitter 113*a* and the IR receiver 112*a* are arranged opposite to each other and adjacent to each other to facilitate infrared transmission and reception of infrared dimming signals.

The power source–light source integrated module 120A-130A is equipped with an infrared physical control mechanism, including, for example, a dimming signal control knob 121A, which is used to emit and adjust infrared signals. The physical control mechanism can be in the form of a dimming signal control knob 121A. Of course, it can also be in the form of a dimming signal control button or a dimming signal shifting control key, or any other form and structure suitable for dimming.

The dimming signal control knob 121A can be manually adjusted by the operator through the associated manipulator 124A. By opening the waterproof sealed lamp housing, the operator can directly reach the manipulator 124A, and manually adjust the light of the power source–light source integrated module 120A-130A in the infrared dimming mode on site by manipulating the dimming signal control knob 121A, so as to realize the brightness or/and light color control of the LED lamp.

Figure 17:
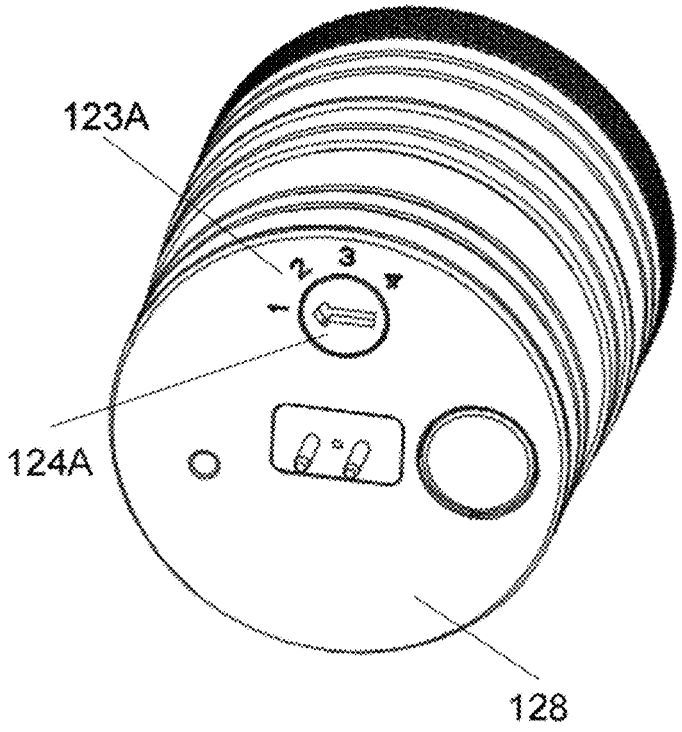
FIG. 17 shows a schematic view of an example of the IR dimming manipulator and dimming level identification at the end of the light source–driver integrated module of the integral LED spotlight shown in FIG. 15.
Figure 18:
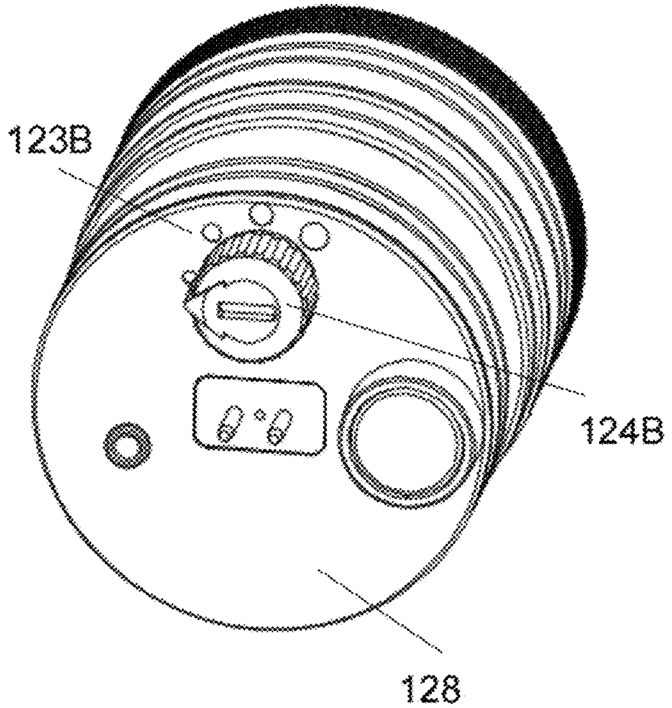
FIG. 18 shows a schematic view of another example of the IR dimming manipulator and dimming level identification at the end of the light source–driver integrated module of the integral LED spotlight shown in FIG. 15.

FIGS. 17-18 show that the physical control mechanism can realize a stepwise dimming, that is, the schematic view showing two examples of the IR dimming manipulator and dimming level identification at the bottom of the light source–power source integration module 120A-130A. The example in FIG. 17 shows that the IR signal manipulator 124A comes out from the bottom but is generally flush with the bottom. Its dimming level identification 123A is marked with numbers 1, 2, 3 and 4 to facilitate the user to identify the current position of the physical control mechanism and the corresponding dimming level. It is divided into four levels of dimming Therefore, the IR signal manipulator 124A can be screwed with a screwdriver for dimming. The example in FIG. 18 shows that the IR signal manipulator 124B is exposed and protrudes out of the bottom. Its dimming level mark 123B is marked with four gradually increasing circles to facilitate the user to identify the current position of the physical control mechanism and the corresponding dimming level. It is divided into four levels of dimming Therefore, the operator can directly screw the IR signal manipulator 124A by hand for dimming. Of course, those skilled in the art can understand that the IR signal manipulator 124B can be provided with any suitable identification, including Arabic numeral combination, Roman numeral combination, gradual geometric figure combination, etc.

IR Dimming Control

Figure 19:
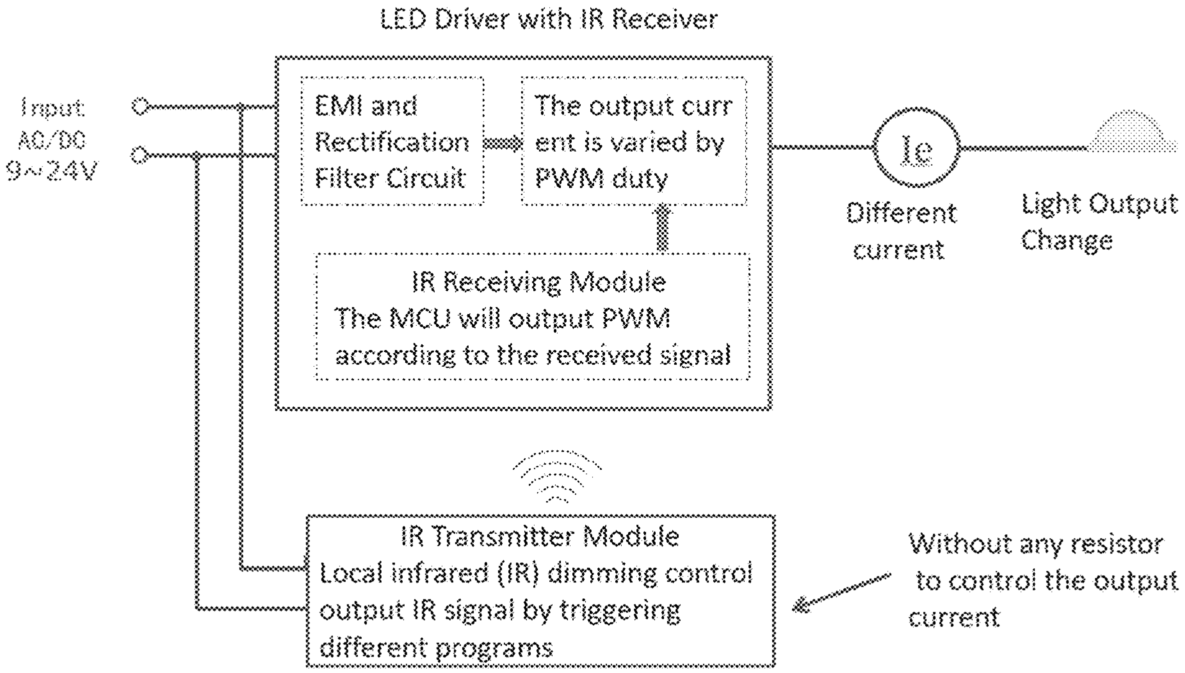
FIG. 19 shows a schematic flowchart of an IR dimming control according to an embodiment of the present application.
Figure 20:
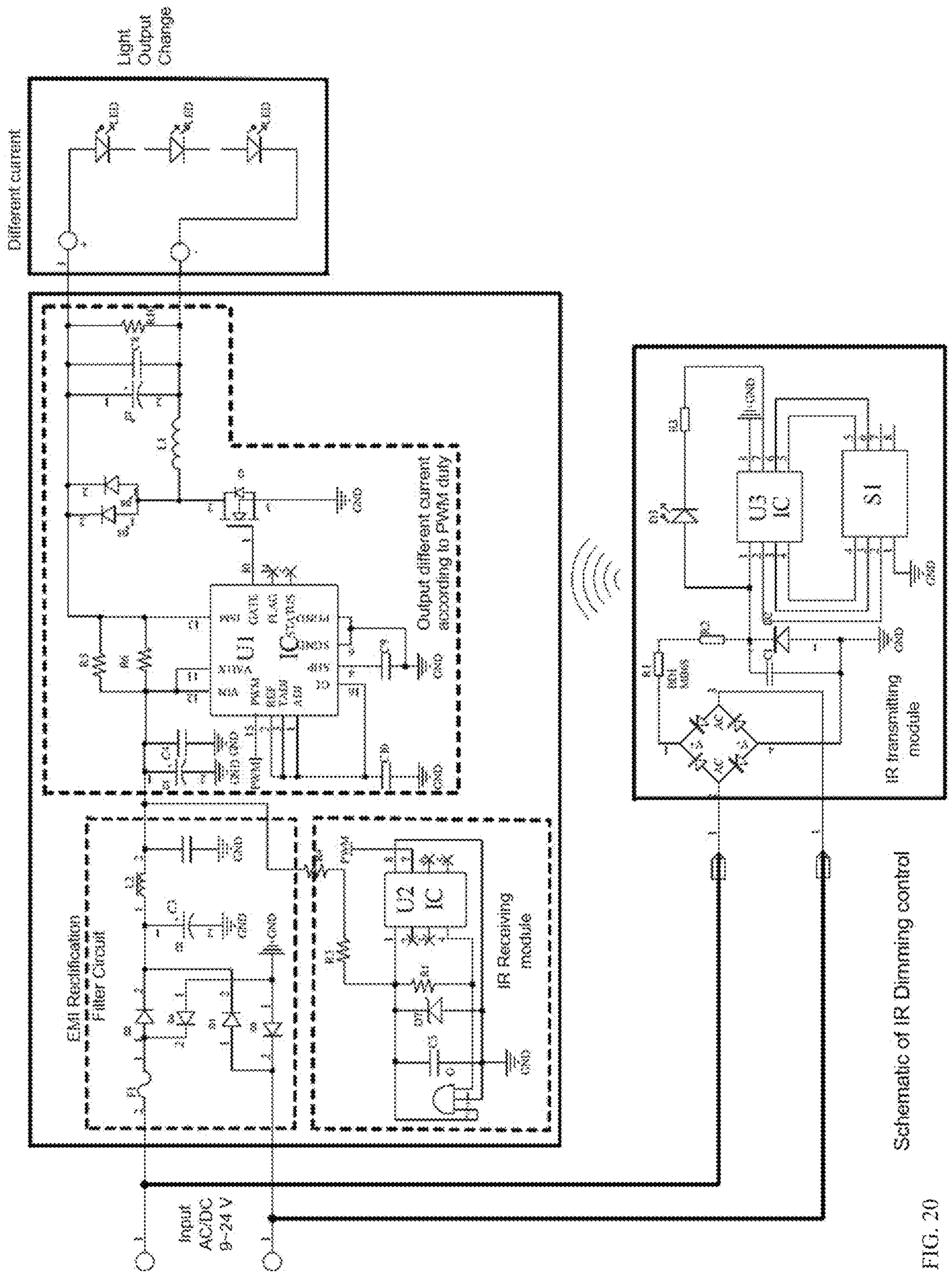
FIG. 20 shows a circuit design example according to the IR dimming control shown in FIG. 19.

FIG. 19 shows a schematic flowchart of an IR dimming control according to an embodiment of the present application. FIG. 20 shows a circuit design example according to the IR dimming control shown in FIG. 19. As shown in FIGS. 19-20, the IR emitting module with IR emitter can transmit infrared signals to the LED driver (driving circuit) with IR receiver, which is received by the IR receiving module with an IR receiver. MCU can output pulse width modulated signal (PWM) according to the received signals. The pulse width modulated signal (PWM) can change the output current through EMI and rectifier filter circuit, so as to change the output of light, such as changing the output power and color of light, etc. It can be seen that the entire IR dimming process does not involve any resistor to control the output current.

Other Designs/Concepts

Upon reading and understanding the description and the inventive concept of the application, those skilled in the art can understand that the following designs can be selectively applied to one or more of the above embodiments or replaced accordingly.

FIGS. 9A-9E show schematic block diagrams of LED spotlights, integrated LED light source modules and driver modules of various configurations and layouts, and local IR dimming assemblies.

Figure 9A:
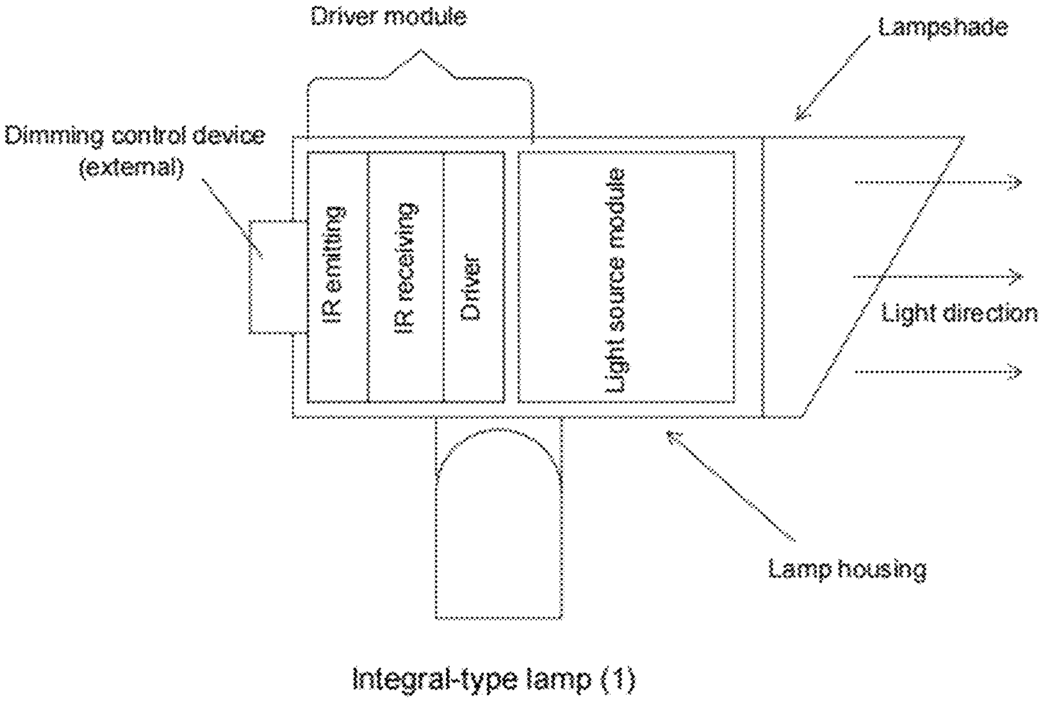
FIGS. 9A-9E show schematic block diagrams of LED spotlights, integrated LED light source modules and driver modules of various configurations and layouts, and local IR dimming assemblies.

FIG. 9A shows a schematic view of the structure and layout of an integral LED lamp, in which the LED lamp is integral, or monolithic. Wherein, an independent LED light source module and a driver module are arranged in the lamp housing, and the IR emitter and IR receiver can be integrated in the driver module, wherein the adjusting control device (i.e., the adjusting physical mechanism) of the IR emitter is external, that is, it is external to the housing, and at least a part of it is exposed outside of the lamp housing. During disassembly, it is necessary to remove the lamp housing before removing the LED light source module and driver module inside.

Figure 9B:
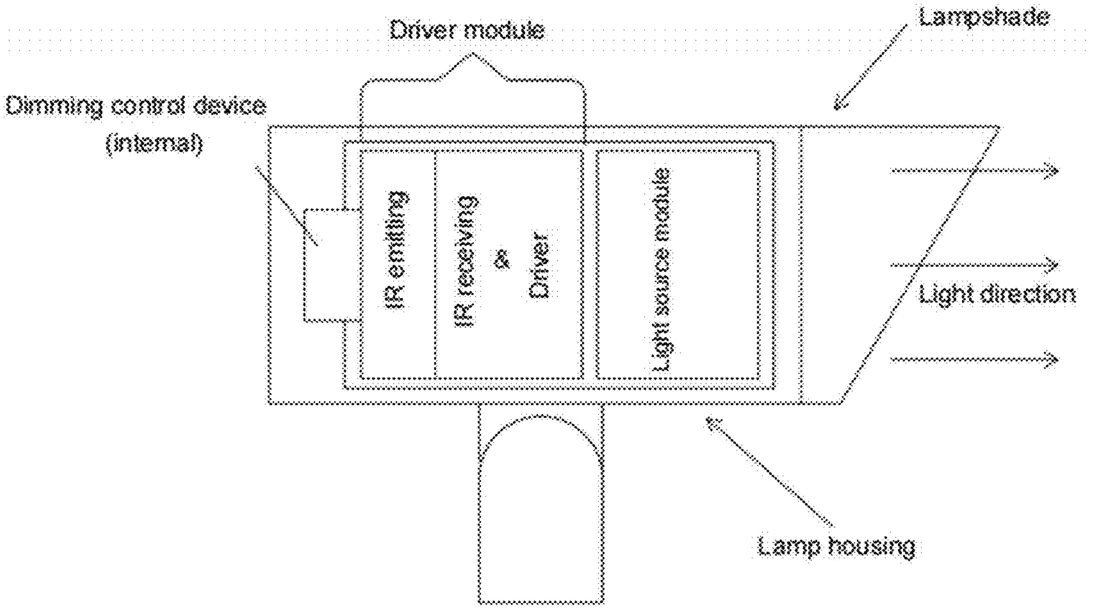

FIG. 9B shows the schematic view of the structure and layout of another integral LED lamp, in which the LED lamp is integral, or monolithic, and an independent replaceable LED light source module and/or driver module are set in the lamp housing. The IR emitter and the IR receiver can be integrated in the driver module, in which the dimming control device (i.e., the physical dimming mechanism) of the IR emitter is built in the lamp housing. During disassembly, it is necessary to remove the lamp housing before removing the LED light source module and driver module inside.

Figure 9C:
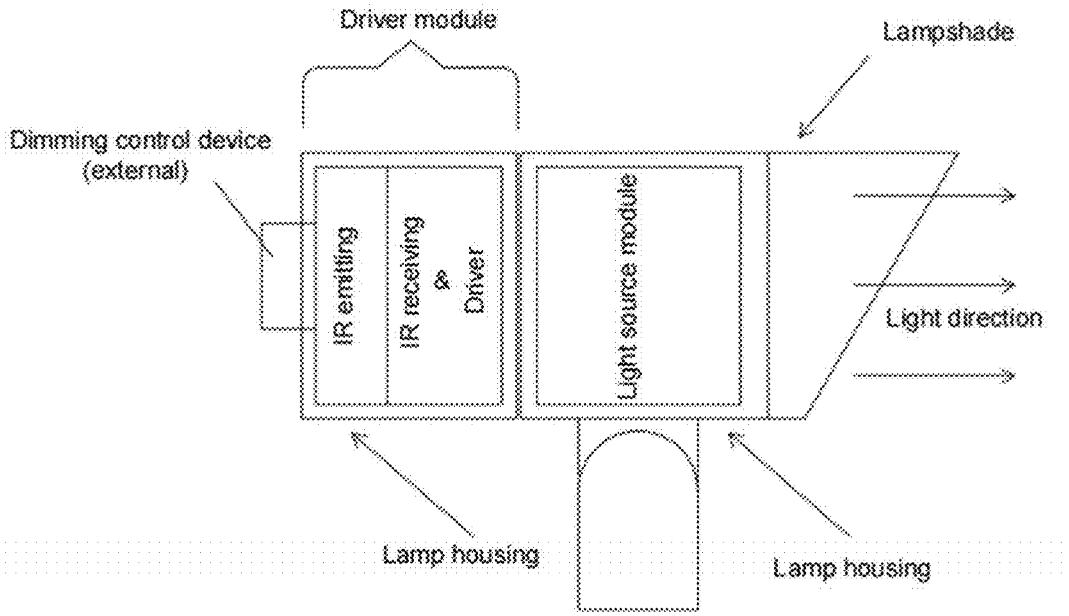

FIG. 9C shows a schematic view of the structure and layout of a split-type LED lamp, in which the lamp housing of the LED lamp is a split-type, and at least two segmented lamp housings are detachably installed together side by side. A light source module is arranged in one of the lamp housings. A driver module is installed in another lamp housing, and both IR emitter and IR receiver can be integrated in the driver module, wherein the dimming control device (i.e., physical dimming mechanism) of the IR emitter is externally arranged outside of the lamp housing. In this way, the segmented lamp housing together with the corresponding LED light source module and/or driver module installed inside can be removed and installed separately, so as to facilitate the removal, installation, maintenance and replacement of LED lamps, etc. . . .

Figure 9D:
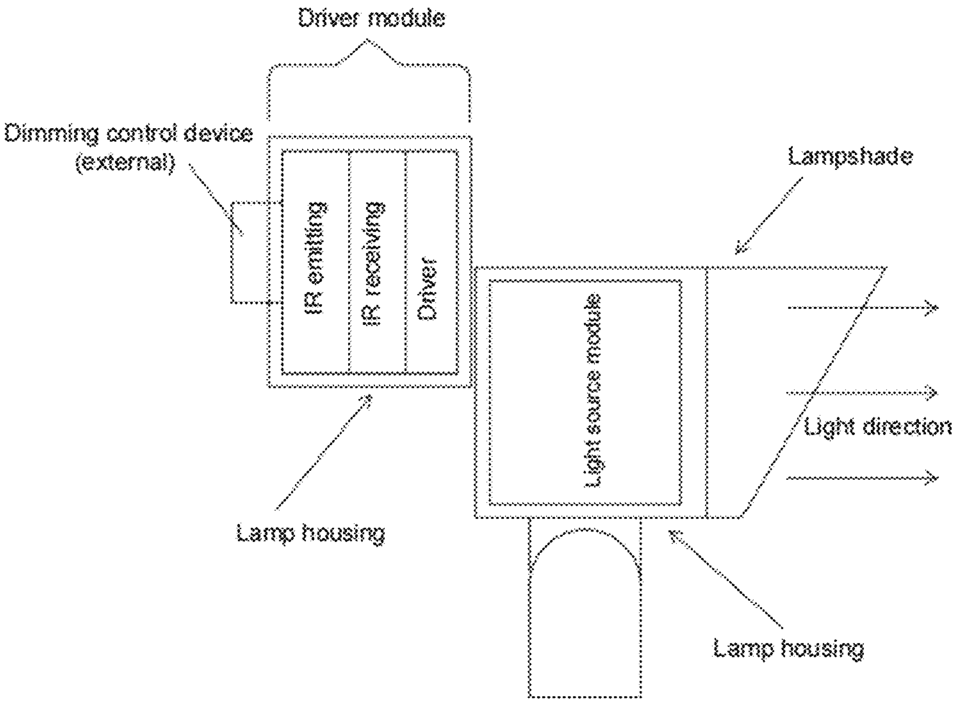

FIG. 9D shows a schematic view of the structure and layout of another split-type LED lamp, wherein the lamp housing of the LED lamp is split, and at least two lamp housings are installed together in sections and can be rotated and adjusted relative to each other. A light source module is arranged in one of the lamp housings. A driver module is installed in another lamp housing, and both IR emitter and IR receiver can be integrated in the driver module, wherein the dimming control device (i.e., physical dimming mechanism) of the IR emitter is externally arranged outside of the lamp housing. In this way, the lamp housing segments together with the corresponding LED light source module and/or driver module installed inside can be removed and installed separately, so as to facilitate the removal, installation, maintenance and replacement of LED lamps, etc. . . . .

Figure 9E:
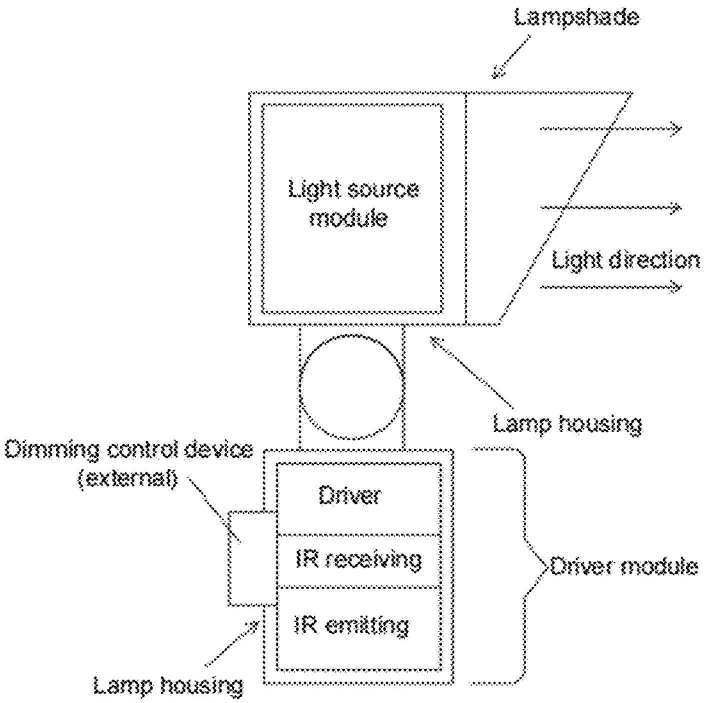

FIG. 9E shows a schematic view of the structure and layout of another split-type LED lamp, wherein the lamp housing of the LED lamp is split, and at least two lamp housings are installed on opposite sides of the support and separated from each other. A light source module is arranged in one of the lamp housings. A driver module is installed in another lamp housing, and both IR emitter and IR receiver can be integrated in the driver module, wherein the dimming control device (i.e., physical dimming mechanism) of the IR emitter is externally arranged outside of the lamp housing. In this way, the lamp housing segments together with the corresponding LED light source module and/or driver module installed inside can be removed and installed separately, so as to facilitate the removal, installation, maintenance and replacement of LED lamps, etc.

As mentioned above, the lamp housing can be integral or split.

Figure 15:
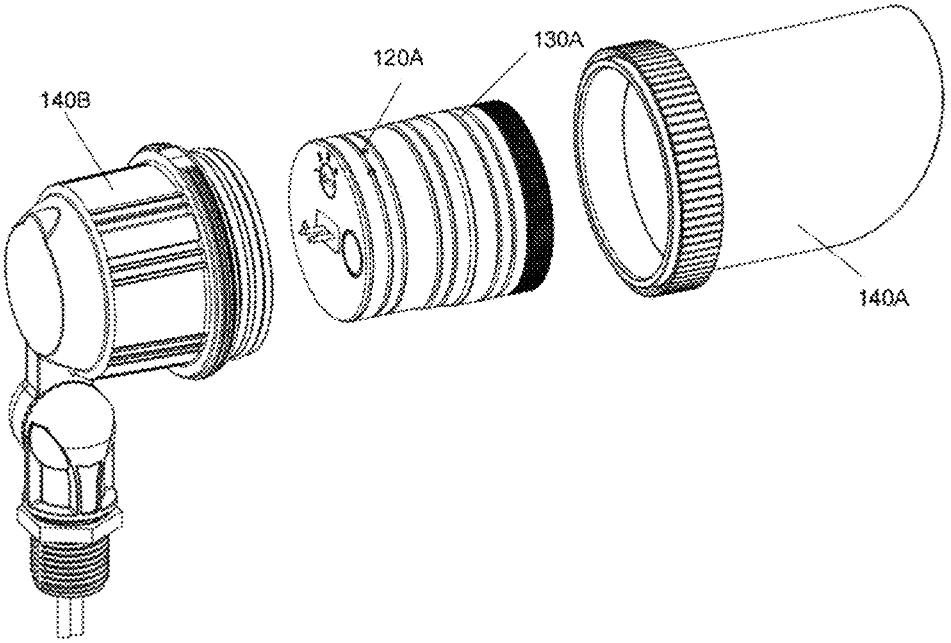
FIG. 15 shows a schematic view of a light source–driver integrated module of an integral LED spotlight with a local IR dimming assembly according to another embodiment of the present application.

The LED light source module and the driver module can be integrated, that is, integrated into a single module, for example, as shown in FIG. 6 and FIG. 15. The LED light source module and the driver module can also be independent of each other, for example, as shown in FIG. 2, FIG. 4 and FIGS. 13-14.

Both the IR emitter and the IR receiver can be installed at the LED light source module, or both can be installed at the driver module.

One of the IR emitter and the IR receiver can be installed on the LED light source module, and the other can be set at the opposite position of the driver module to facilitate the infrared communication. The physical control mechanism of the IR emitter can be installed on the outside of the lamp housing to facilitate the user's operation and control.

One of the IR emitter and the IR receiver may be mounted on one of the LED light source module and the driver module, and the other may be mounted on the lamp housing and on the inner side thereof. The physical control mechanism can be installed on the outside of the lamp housing and connected with the IR emitter through the signal wire.

The IR receiver can be installed on one of the LED light source module and the driver module, and the IR emitter can be installed on the lamp housing and on its inner side.

Both the IR emitter and the IR receiver can be installed on the lamp housing and are at the inner side thereof.

The IR emitter can be installed on the inner side or the inner end face of the lamp housing.

The IR receiver can be installed on one of the LED light source module and the driver module, and the IR emitter can be installed on the lamp housing and on its outer side.

The physical control mechanism of the IR emitter can be arranged to extend at least partially or expose outside of the lamp housing, or be completely built in the lamp housing.

The IR emitter can be installed on the outer side or the outer end face of the lamp housing.

The physical control mechanism of the IR emitter can be reached from the outside of the lamp housing.

The physical control mechanism of the IR emitter can be installed to extend or expose the outside of the lamp housing.

An access window can be opened on the lamp housing, and the user can operate and control the physical mechanism through the access window.

The physical control mechanism can be waterproof and sealed relative to the lamp housing.

The angle range of signal transmission and reception of the IR emitter and the IR receiver may be in the range of 10°-150°, for example, 10°-120°, such as in the range of 20°-60°.

The physical control mechanism may include one of the dimming signal control knob, the dimming signal control button and the dimming signal shift control key.

At least one of the optical output power of LED lamps, the color temperature of white light and the color of color light can be locally controlled by locally operating the physical control mechanism of the IR emitter.

The physical control mechanism may include a dimming signal control knob and a manipulator which are operably connected.

The LED light source module may include an LED circuit and an LED light source electrically connected to the LED circuit. The signal output terminal of the IR receiver is electrically connected to the control end of the driver module, and the power output terminal of the driver module is electrically connected to the LED circuit.

LED light source module and driver module can be integrated. The LED light source module and the driver module can be independent modules.

The lamp housing may have a hollow, substantially cylindrical shape.

The physical control mechanism can be controlled by levels, and can also be provided with level marks matching with the physical control mechanism.

A wireless communication module arranged in the LED lamp can further be included.

The lamp housing can be integral, and both the LED light source module and the driver module can be arranged in the integral lamp housing. Alternatively, the lamp housing may be a split-type, including a first lamp housing and a second lamp housing, wherein the LED light source module may be arranged in the first lamp housing, and the driver module may be arranged in the second lamp housing.

The LED lamp can be an integral LED lamp, and both the LED light source module and the driver module can be set in the integral lamp housing.

The LED lamp can also be a split-type LED lamp, including at least a first lamp housing and a second lamp housing, wherein the LED light source module can be arranged in the first lamp housing, and the driver module can be arranged in the second lamp housing.

The LED light source module can be removed from the LED lamp together with the first lamp housing, and the driver module can be removed from the LED lamp together with the second lamp housing.

A dimming level mark matching with the physical control mechanism can be set on the LED lamp near the physical control mechanism.

The local IR dimming assembly can further include a Bluetooth communication module configured for remote dimming, and the Bluetooth communication module is configured to be in a Bluetooth connection with an external Bluetooth communication module.

LED lamps can be selected from one of an outdoor LED spotlight, a landscape lighting LED lamp, a projection lighting LED lamp and a flood lighting LED lamp, especially high-power outdoor LED spotlight, courtyard led spotlight, landscape lighting LED spotlight, etc.

The above descriptions are only preferred embodiments of this disclosure, and are not intended to limit the disclosure. For those of ordinary skill in the art, the disclosure may have various modifications and variations. Any modifications, equivalent replacements, and improvements made within the spirit and principle of this disclosure shall be included in the scope of this disclosure.

What is claimed is:

1. A local IR dimming assembly integrated with an LED lamp, the LED lamp comprises a hollow lamp housing, an LED light source module and a driver module, the local IR dimming assembly comprising:

an IR emitter for emitting an infrared signal, the IR emitter comprising a physical control mechanism for controlling the emission of the infrared signal; and an IR receiver configured to be electrically connected with the driver module, and to receive and to transmit the infrared signal from the IR emitter to the driver module;

wherein the IR emitter and the IR receiver are both arranged in the LED lamp in infrared communication; and wherein, through local manipulation of the physical control mechanism of the IR emitter, at least the optical output power of the LED lamp is locally controlled.

2. The local IR dimming assembly according to claim 1, wherein the physical control mechanism comprises one selected from a group consisting of a dimming signal control knob, a dimming signal control button and a dimming signal shift control key.

3. The local IR dimming assembly according to claim 1, wherein the LED light source module comprises an LED circuit and an LED light source electrically connected to the LED circuit;

a signal output terminal of the IR receiver is electrically connected to a control end of the driver module; and a power output terminal of the driver module is electrically connected to the LED circuit.

4. The local IR dimming assembly according to claim 1, wherein the LED light source module and the driver module are integrated; or alternatively the LED light source module and the driver module are independent modules.

5. The local IR dimming assembly according to claim 1, wherein the lamp housing has a hollow substantially cylindrical shape.

6. The local IR dimming assembly according to claim 1, wherein both the IR emitter and the IR receiver are arranged on the LED light source module, or both are arranged on the driver module.

7. The local IR dimming assembly according to claim 1, wherein one of the IR emitter and the IR receiver is arranged on the LED light source module, and the other one is arranged on the driver module.

8. The local IR dimming assembly according to claim 1, wherein one of the IR emitter and the IR receiver is arranged on one of the LED light source module and the driver module, and the other one of the IR emitter and the IR receiver is at least partially built in the inner side of the lamp housing.

9. The local IR dimming assembly according to claim 8, wherein the IR receiver is arranged on one of the LED light source module and the driver module, and the IR emitter is at least partially built in the inner side of the lamp housing.

10. The local IR dimming assembly according to claim 1, wherein both the IR emitter and the IR receiver are installed on the lamp housing and are located on the inner side thereof.

11. The local IR dimming assembly according to claim 1, wherein the IR receiver is arranged on one of the LED light source module and the driver module, and at least a part of the IR emitter is arranged on the lamp housing and on the outside thereof.

12. The local IR dimming assembly according to claim 1, wherein the physical control mechanism of the IR emitter is at least partially accessible from the outside of the lamp housing.

13. The local IR dimming assembly according to claim 12, wherein the physical control mechanism of the IR emitter is arranged to extend at least partially outside of the lamp housing, or is completely built in the lamp housing.

14. The local IR dimming assembly according to claim 1, wherein the physical control mechanism comprises an operatively associated dimming signal control knob (21) and a manipulator (24).

15. The local IR dimming assembly according to claim 1, wherein the physical control mechanism is selected from one of a group consisting of a stepwise physical control mechanism and a stepless physical control mechanism.

16. An LED lamp comprises a hollow lamp housing, an LED light source module and a driver module, and the local IR dimming assembly according to claim 1, wherein the LED light source module and the driver module are in electric connection with the IR receiver of the local IR dimming assembly.

17. The LED lamp according to claim 16, wherein:

the LED lamp has an integral lamp housing, and the LED light source module and the driver module are arranged in the integral lamp housing;

or alternatively, the LED lamp is a split-type LED lamp, including at least a first lamp housing and a second lamp housing, wherein the LED light source module is arranged in the first lamp housing, and the driver module is arranged in the second lamp housing.

18. The LED lamp according to claim 16, wherein at a position on the LED lamp adjacent to the physical control mechanism is provided with a dimming level mark matched with the physical control mechanism.

19. The LED lamp according to claim 16, wherein the local IR dimming assembly further comprises:

a Bluetooth communication module configured as remote dimming, and the Bluetooth communication module is configured to make a Bluetooth connection with an external device with a corresponding Bluetooth communication module.

20. The LED lamp according to claim 16, wherein the LED lamp is selected from one of a group consisting of an outdoor LED spotlight, a landscape lighting LED lamp, a projection lighting LED lamp and a flood lighting LED lamp.

* * * * *